(12) United States Patent
Song (10) Patent No.: US 6,327,471 B1
(45) Date of Patent: Dec. 4, 2001

(54) METHOD AND AN APPARATUS FOR POSITIONING SYSTEM ASSISTED CELLULAR RADIOTELEPHONE HANDOFF AND DROPOFF

(75) Inventor: Wei-jei Song, Aliso Viejo, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/025,962

(22) Filed: Feb. 19, 1998

(51) Int. Cl.$^7$ .................................................. H04Q 7/20
(52) U.S. Cl. .................. 455/440; 455/12.1; 455/427; 455/456
(58) Field of Search .................................. 455/412, 427, 455/436, 438, 440, 442, 456, 12.1, 13.2, 343, 426; 342/352, 357; 370/331, 332, 333, 334, 352, 335

(56) References Cited

U.S. PATENT DOCUMENTS

| | | | |
|---|---|---|---|
| 3,604,911 | 9/1971 | Schmitt | 235/181 |
| 3,975,628 | 8/1976 | Graves et al. | 250/199 |
| 4,426,712 | 1/1984 | Gorski-Popiel | 375/96 |
| 4,445,118 | 4/1984 | Taylor et al. | 343/357 |
| 4,463,357 | 7/1984 | MacDoran | 343/460 |
| 4,578,678 | 3/1986 | Hurd | 343/357 |
| 4,667,203 | 5/1987 | Counselman, III | 342/357 |
| 4,701,934 | 10/1987 | Jasper | 375/1 |
| 4,754,465 | 6/1988 | Trimble | 375/1 |
| 4,785,463 | 11/1988 | Janc et al. | 375/1 |
| 4,809,005 | 2/1989 | Counselman, III | 342/352 |
| 4,821,294 | 4/1989 | Thomas, Jr. | 375/96 |
| 4,890,233 | 12/1989 | Ando et al. | 364/457 |
| 4,894,842 | 1/1990 | Counselman | 342/357 |
| 4,992,720 | 2/1991 | Hata | 320/23 |
| 4,998,111 | 3/1991 | Ma et al. | 342/352 |
| 5,014,066 | 5/1991 | Counselman, III | 342/352 |
| 5,018,088 | 5/1991 | Higbie | 364/574 |

(List continued on next page.)

FOREIGN PATENT DOCUMENTS

| | | |
|---|---|---|
| 0511741 A1 | 11/1992 | (EP) . |
| 0639901 A2 | 2/1995 | (EP) . |
| 0639901 A3 | 2/1995 | (EP) . |
| 8-065205 | 3/1996 | (JP) . |
| 8-065205A | 3/1996 | (JP) . |
| WO 92/13392 | 8/1992 | (WO) . |
| WO 00/19644 | 4/2000 | (WO) . |

OTHER PUBLICATIONS

D.J.R. Van Nee and A.J.R.M. Coenen, "New Fast GPS Code–Acquistion Technique Using FFT," Jan. 17, 1991, *Electronics Letters*, vol. 27, No. 2.

D. J. R. Van Nee and A.J.R.M. Coenen, "New Fast GPS Code–Acquistion Technique Using FFT," Jan. 17, 1991, *Electronics Letters*, vol. 27, No. 2.

*Primary Examiner*—Nay Maung
*Assistant Examiner*—Quochien B. Vuong
(74) *Attorney, Agent, or Firm*—Thomas, Kayden, Horstemeyer & Risley, LLP (57) ABSTRACT

A method and an apparatus is provided for acquiring satellite signals to establish the exact spatial position of a cellular radiotelephone, in order to perform a timely dropoff or smooth handoff to another base station or frequency. The cellular radiotelephone is equipped with its own positioning system which uses satellite data to determine its spatial position. The communication system is preferably a Code Division Multiple Access (CDMA) system, and the positioning system is preferably a Global Positioning System (GPS). The method of the present invention may be used to determine the base station closest to the cellular radiotelephone. In the alternative, it may be used to compute a distance between the cellular radiotelephone and a location where the quality level of the cellular radiotelephone communication signal is predicted to be less than the predetermined value, and to determine from the computed distance whether the cellular radiotelephone should be handed off.

33 Claims, 2 Drawing Sheets

U.S. PATENT DOCUMENTS

| | | | |
|---|---|---|---|
| 5,036,329 | 7/1991 | Ando | 342/357 |
| 5,043,736 | 8/1991 | Darnell et al. | 342/357 |
| 5,108,334 | 4/1992 | Eschenbach et al. | 455/314 |
| 5,148,042 | 9/1992 | Nakazoe | 307/65 |
| 5,153,591 | 10/1992 | Clark | 341/51 |
| 5,161,248 * | 11/1992 | Bertiger et al. | 455/12.1 |
| 5,179,724 | 1/1993 | Lindoff | 455/76 |
| 5,202,829 | 4/1993 | Geier | 364/449 |
| 5,214,789 * | 5/1993 | George | 455/440 |
| 5,222,245 * | 6/1993 | Ando et al. | 455/13.2 |
| 5,225,842 | 7/1993 | Geier | 364/449 |
| 5,253,268 | 10/1993 | Omura et al. | 375/1 |
| 5,276,765 | 1/1994 | Fremman et al. | 395/2 |
| 5,293,170 | 3/1994 | Lorenz et al. | 376/309 |
| 5,293,398 | 3/1994 | Hamao et al. | 375/1 |
| 5,297,097 | 3/1994 | Etoh et al. | 365/226 |
| 5,311,195 | 5/1994 | Mathis et al. | 342/357 |
| 5,323,164 | 6/1994 | Endo | 342/357 |
| 5,343,209 | 8/1994 | Sennott et al. | 342/357 |
| 5,345,244 | 9/1994 | Gildea et al. | 342/357 |
| 5,347,536 | 9/1994 | Meehan | 375/1 |
| 5,352,970 | 10/1994 | Armstrong II | 320/39 |
| 5,363,030 | 11/1994 | Ford et al. | 320/13 |
| 5,378,155 | 1/1995 | Eldridge | 434/11 |
| 5,379,224 | 1/1995 | Brown et al. | 364/449 |
| 5,396,515 | 3/1995 | Dixon et al. | 375/208 |
| 5,402,346 | 3/1995 | Lion et al. | 364/436 |
| 5,402,347 | 3/1995 | McBurney et al. | 364/436 |
| 5,410,747 | 4/1995 | Ohmagari et al. | 455/118 |
| 5,416,712 | 5/1995 | Geier et al. | 364/450 |
| 5,418,818 | 5/1995 | Marchetto et al. | 375/264 |
| 5,420,593 | 5/1995 | Niles | 342/357 |
| 5,440,313 | 8/1995 | Osterdock et al. | 342/352 |
| 5,450,344 | 9/1995 | Woo et al. | 364/449 |
| 5,498,239 | 3/1996 | Galel et al. | 604/95 |
| 5,504,684 | 4/1996 | Lau et al. | 364/443 |
| 5,546,445 * | 8/1996 | Dennison et al. | 455/456 |
| 5,548,613 | 8/1996 | Kahu et al. | 375/208 |
| 5,550,811 | 8/1996 | Kahu et al. | 370/18 |
| 5,551,059 * | 8/1996 | Hutcheson et al. | 455/440 |
| 5,568,473 | 10/1996 | Hemmati | 370/18 |
| 5,577,023 | 11/1996 | Marum et al. | 370/16 |
| 5,577,025 | 11/2000 | Skinner et al. | 370/22 |
| 5,592,173 * | 1/1997 | Lau et al. | 342/357 |
| 5,594,453 | 1/1997 | Rodal et al. | 342/357 |
| 5,608,722 | 3/1997 | Miller | 370/320 |
| 5,623,485 | 4/1997 | Bi | 370/209 |
| 5,625,668 | 4/1997 | Loomis et al. | 379/58 |
| 5,640,429 | 6/1997 | Michaels et al. | 375/340 |
| 5,640,431 | 6/1997 | Bruckert et al. | 375/344 |
| 5,642,377 | 6/1997 | Chung et al. | 375/200 |
| 5,644,591 | 7/1997 | Sutton | 375/200 |
| 5,649,000 * | 7/1997 | Lee et al. | 455/436 |
| 5,650,792 | 7/1997 | Moore et al. | 343/725 |
| 5,654,718 | 8/1997 | Beason et al. | 342/357 |
| 5,663,734 | 9/1997 | Krasner | 342/357 |
| 5,663,735 | 9/1997 | Eshenbach | 342/357 |
| 5,689,814 | 11/1997 | Hagisawa et al. | 455/69 |
| 5,722,061 | 2/1998 | Hutchison, IV et al. | 455/245.1 |
| 5,734,674 | 3/1998 | Fenton et al. | 375/207 |
| 5,734,966 | 3/1998 | Farrer et al. | 455/63 |
| 5,737,329 | 4/1998 | Horiguchi | 370/342 |
| 5,739,596 | 4/1998 | Takizawa et al. | 307/66 |
| 5,749,067 | 5/1998 | Barrett | 704/233 |
| 5,781,156 | 7/1998 | Krasner | 342/357 |
| 5,784,695 * | 7/1998 | Upton et al. | 455/436 |
| 5,786,789 | 7/1998 | Janky | 342/357 |
| 5,812,087 | 9/1998 | Krasner | 342/357 |
| 5,812,932 * | 9/1998 | Wiedeman et al. | 455/12.1 |
| 5,825,327 | 10/1998 | Krasner | 342/357 |
| 5,828,694 | 10/1998 | Schipper | 375/208 |
| 5,831,574 | 11/1998 | Krasner | 342/357 |
| 5,832,021 | 11/1998 | Kondo | 375/200 |
| 5,841,396 | 11/1998 | Krasner | 342/357 |
| 5,845,203 | 12/1998 | LaDue | 455/414 |
| 5,854,605 | 12/1998 | Gildea | 342/357 |
| 5,862,465 | 1/1999 | Ou | 455/234.1 |
| 5,862,475 * | 1/1999 | Zicker et al. | 455/426 |
| 5,867,535 | 2/1999 | Phillips et al. | 375/295 |
| 5,867,795 | 2/1999 | Novis et al. | 455/566 |
| 5,872,540 | 2/1999 | Casabona et al. | 342/362 |
| 5,874,914 | 2/1999 | Krasner | 342/357 |
| 5,877,724 | 3/1999 | Davis | 342/357 |
| 5,877,725 | 3/1999 | Kalafus | 342/357 |
| 5,881,371 | 3/1999 | Reynolds | 455/83 |
| 5,883,594 | 3/1999 | Lau | 342/357 |
| 5,884,214 | 3/1999 | Krasner | 701/207 |
| 5,889,474 | 3/1999 | LaDue | 340/825.49 |
| 5,903,654 | 5/1999 | Milton et al. | 380/49 |
| 5,907,809 | 5/1999 | Molnar et al. | 455/456 |
| 5,909,640 | 6/1999 | Farrer et al. | 455/63 |
| 5,917,829 | 6/1999 | Hertz et al. | 370/479 |
| 5,920,283 | 7/1999 | Shaheen et al. | 342/357 |
| 5,923,703 | 7/1999 | Pon et al. | 375/209 |
| 5,924,024 | 7/1999 | Ikeda et al. | 455/313 |
| 5,926,131 | 7/1999 | Sakumoto et al. | 342/357 |
| 5,930,242 * | 7/1999 | Mimura | 370/331 |
| 5,936,572 | 8/1999 | Loomis et al. | 342/357 |
| 5,943,363 | 8/1999 | Hanson et al. | 375/206 |
| 5,945,944 | 8/1999 | Krasner | 342/357.06 |
| 5,956,328 | 9/1999 | Sato | 370/335 |
| 5,963,582 | 10/1999 | Stansel, Jr. | 375/200 |
| 5,970,084 | 10/1999 | Honda | 375/200 |
| 5,977,909 | 11/1999 | Harrison et al. | 342/357.09 |
| 5,982,324 | 11/1999 | Watter et al. | 342/357.06 |
| 5,987,016 | 11/1999 | He | 370/335 |
| 5,991,309 | 11/1999 | Jensen et al. | 370/492 |
| 5,991,613 | 11/1999 | Euscher et al. | 455/277.1 |
| 5,995,537 | 11/1999 | Kondo | 375/208 |
| 5,999,124 | 12/1999 | Sheynblat | 342/357.09 |
| 6,002,362 | 12/1999 | Gudat | 342/357.03 |
| 6,002,363 | 12/1999 | Krasner | 342/357.1 |
| 6,002,709 | 12/1999 | Hendrickson | 375/206 |
| 6,009,551 | 12/1999 | Sheynblat | 714/776 |
| 6,016,119 | 1/2000 | Krasner | 342/357.06 |
| 6,023,462 | 2/2000 | Nieczyporowicz et al. | 370/335 |
| 6,041,222 | 2/2000 | Horton et al. | 455/255 |
| 6,047,016 | 4/2000 | Ramberg et al. | 375/200 |
| 6,047,017 | 4/2000 | Cahn et al. | 375/200 |
| 6,049,715 | 4/2000 | Willhoff et al. | 455/436 |
| 6,052,081 | 4/2000 | Krasner | 342/357.02 |
| 6,061,018 | 5/2000 | Sheynblat | 342/357.06 |
| 6,064,336 | 5/2000 | Krasner | 342/357.05 |
| 6,064,688 | 5/2000 | Yanagi | 375/149 |
| 6,075,809 | 6/2000 | Naruse | 375/147 |
| 6,104,338 | 8/2000 | Krasner | 342/357.06 |
| 6,104,340 | 8/2000 | Krasner | 342/357.1 |
| 6,107,960 | 8/2000 | Krasner | 342/357.09 |
| 6,111,540 | 8/2000 | Krasner | 342/357.1 |
| 6,131,067 | 10/2000 | Girerd et al. | 701/213 |
| 6,133,871 | 10/2000 | Krasner | 342/357.06 |
| 6,133,873 | 10/2000 | Krasner | 342/357.12 |
| 6,133,874 | 10/2000 | Krasner | 342/357.15 |
| 6,150,980 | 11/2000 | Krasner | 342/357.1 |

* cited by examiner

METHOD AND AN APPARATUS FOR POSITIONING SYSTEM ASSISTED CELLULAR RADIOTELEPHONE HANDOFF AND DROPOFF

BACKGROUND OF THE INVENTION

1. Field of the Invention

The present invention relates to handoffs and dropoffs in a cellular communication system. More particularly, the present invention relates to establishing whether a cellular radiotelephone with a weak signal should be handed off or dropped off.

2. Description of Related Art

A radiotelephone system consists of many base stations, also known as cell sites, each coupled to a mobile telephone switching office (MTSO) connected to the public switched telephone network (PSTN). Each base station is equipped with an antenna that receives and radiates radiotelephone signals in order to communicate with cellular radiotelephones and switch the signals from the radiotelephones to the mobile telephone switching office. The base station also provides the proper channels for the radiotelephones, thus enabling communication with the base station. The mobile telephone switching office switches the signals from the base station to the PSTN and vice versa.

Code Division Multiple Access (CDMA), and spread spectrum systems in general, were previously dismissed as unworkable in the mobile radio environment because of the near-far problem. Near-far problem occurs in cellular communication systems where different transmitters interfere with the base station transmitter. In the mobile radiotelephone environment, some users may be located near the base station, and others may be located far away. The propagation path loss difference between those extreme users can be many tens of dB. This reduces overall, average link capacity. The anti-jamming capacity of spread spectrum systems, such as CDMA systems, aids in such situations, but unfortunately not enough to overcome the disparity between a strong nearby interfering signal and an attenuated remote signal. CDMA systems use codes to separate one signal from another. If there are enough different codes available, the limit on the number of users is determined by a system jamming margin, because a receiver will work as long as the composite power of all unwanted signals does not exceed the power of the desired signal by more than a jamming margin.

It had been assumed that all mobile radiotelephones in a cell had to transmit constant power. If, however, rather than using constant power the transmitters can be controlled in such a way that their power level can be changed so that the received power levels from all the users are roughly equal, the benefits of the spread spectrum system are realized. In systems where the received power is controlled, the subscribers can occupy the same spectrum, and the hoped-for benefits of interference averaging accrue. However, the systems that employ power control for intracell solution of the near-far problem suffer from significant loss in receiver sensitivity because all signals must arrive at the receiver (base station) at equal power levels, to maximize the number of simultaneous users. Power control may be accomplished in each radiotelephone by verifying its distance from the base station and adjusting its output power accordingly, so that the base station receives the signal at the predetermined signal power level. Otherwise, the weakest mobile transmitter, especially near the edge of a cell, dictates performance of the other cell users, which than have to change their transmitting power to accommodate the weak user.

In order to prevent increase of transmitting signal power of a radiotelephone at the edge of a cell in order to improve transmission and thus cause jamming of the base station by requesting all units in the new cell to increase their transmitting power to that level, handoff to another cell base station is performed by the current cell base station. However, if a user's signal is very weak, the radiotelephone has to be dropped off from the cell by the base station before it wipes out the entire network. Very weak users are not handed over to another cell base station because their performance will be poor near the edge of the adjacent cell after the handoff.

In CDMA systems with power control, if adjacent cells have a base station that can be heard by several base stations, a radiotelephone in that cell has to be in communication with all those base stations in order to accomplish a soft handoff. Soft handoff, also called make-before-break, is performed in CDMA systems where all cells use the same frequency (as defined by the IS-95A standard), and it is possible to make connection to the adjacent cell before leaving the current cell. Soft handoffs require less power, which reduces interference and increases capacity. In a soft handoff, control is handed over to the most convenient base station to service the user, while all other base stations stay in full communication with the user. When the radiotelephone reaches the edge of the cell, the controlling base station assists in its handoff to transfer control to another cell. The base station, however, does not know the location of the radiotelephone and it has to page all radiotelephones in the cell and wait for the arrival of their response, which takes time, and determine the candidate for dropoff or handoff from the response.

In a CDMA system with power control, each participating cell in a soft handoff transmits the same traffic stream to the mobile radiotelephone, bit-for-bit. They do so on any available code channel. Each base station chooses a code channel simply on the basis of availability. The radiotelephone must implement, in its rake receiver, multiple fingers that are capable of "tuning" to any of the, typically 63, available code channels. Embedded in the forward CDMA channel are the reverse power control bits. Each power control bit is interpreted as a command to raise or lower power by an increment of approximately ¾ dB. Each base station makes power control decisions independently. The mobile station is responsible for demodulating the power control bits and raising or lowering its power accordingly. The goal of the power control is to maintain the reverse link transmit power at the lowest possible level commensurate with adequate error performance. The mobile radiotelephone is thus required to interpret the power control bits, which will often disagree, as requiring an increase in power only if all base stations in the handoff say "up". If any participating base station says "down", then the mobile radiotelephone is required to reduce power. This rule is sometimes called "OR of the downs".

CDMA systems uses Mobile Assisted Handoff (MAHO). In practice, this means that the mobile radiotelephone continuously searches for a pilot code using a PN correlator specifically designated for this purpose. All base stations use the same code. If the mobile radiotelephone already has a notion of CDMA system time, as it does if it is already involved in a call, then it can report the relative timing of a newly detected pilot. What distinguishes base stations from one another is the phase of their pilots. The period of each pilot is 26.667 ms. They are separated by a minimum of 64 chips, which is about 52 ms or about 15 km at the speed of light. The mobile radiotelephone timing will normally be sufficiently good that a reported pilot offset unambiguously identifies the base station it has detected.

The mobile radiotelephone reports pilots on the basis of their pilot-to-interference ratio (PIR). The PIR is compared to an absolute threshold to determine when it should be reported as a handoff candidate. This absolute or first threshold is a parameter that the mobile radiotelephone obtains from the overhead messages broadcast by the base stations. When a pilot crosses the first threshold, its presence is reported, via a message, to the network. The network adds that base station to the so-called active set, which is the set of base stations that are participants in the soft handoff of the mobile radiotelephone in question. A second threshold which is not absolute but relative is compared to the difference between the largest PIR in the active set and the PIRs of all other members. When any of them falls below this threshold, another message is transmitted. The normal result is that the base station in question will be dropped from the active set, and that will be reported to the mobile radiotelephone by a signaling message.

The effect of the two thresholds, one absolute, the other relative, is to ensure that any station that is able to contribute in any significant way to the overall signal-to-noise ratio is in the active set with high probability. Conversely, a base station is dropped only when it has deteriorated far below the best station. If the best station is itself marginal then the next strongest station will be retained. This two-threshold scheme has been found in practice to be pretty effective but has a drawback that it sometimes errs on the side of too much handoff. Too much handoff reduces capacity because of the excess number of forward traffic channels needed to support it. It also impacts the number of channel elements, such as CDMA modems, needed in the base stations.

Support for forward link power control differs between the cellular and PCS air interface standards. IS-95A and Rate Set 1 of J-STD-008 standards specify only messaging-based forward power control. That is, when the mobile radiotelephone concludes, because of excessive frame error rate, that its forward signal quality is poor, it sends a report to the base station. This method is relatively slow, being impacted by processing delay in the message parsing by the base station. Rate Set 2, the 14,400 bps set, incorporates a faster forward power control mechanism. Each reverse traffic frame incorporates a bit that reports erasures with a slight processing delay.

In some communication systems it is difficult to accomplish handoff from one base station to another without knowing the exact location of the radiotelephone. This is particularly true for CDMA systems where the handoff is to be done to the base station with a different carrier frequency. In a CDMA-based cellular system, only one carrier frequency is used for all radiotelephones in an area supervised by a base station, but the surrounding base stations may use a different carrier frequency. When the signal in a radiotelephone is weak, or becomes weak at the edge of the current cell, in a CDMA system in which each base station has a different carrier frequency, a new base station's transmittal of a new carrier frequency cannot be received by the radiotelephone with a weak signal, which does not know the new frequency. Since a handoff cannot be completed in that case, the radiotelephone becomes useless. Further, it may impair the ability of other cellular radiotelephones in the cell to transmit.

Therefore, it is necessary to determine which radiotelephone has a weak signal and to perform a handoff or a dropoff of that radiotelephone by the base station of the cell. With conventional methods, the base station can only determine that a weak radiotelephone is within a certain range, without knowing its exact location. Moreover, because the base station can only identify the radiotelephone in response to paging from the base station, it takes time to reach the radiotelephone with a weak signal.

Figure 1:
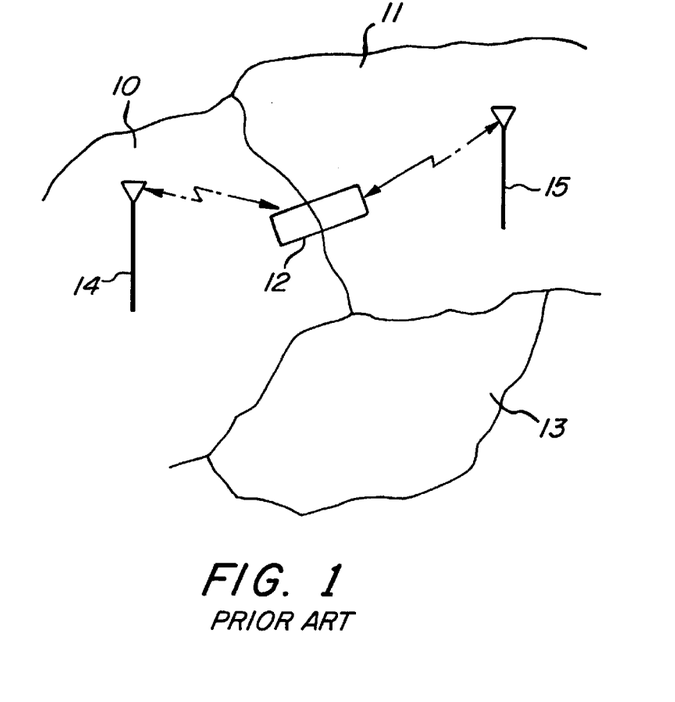
FIG. 1 is a diagramatic illustration showing a radiotelephone within a typical cellular communication system cell network.

FIG. 1 illustrates an exemplary cellular communication system cell network. It should be understood that in the actual cellular communication environment cells 10, 11 and 13 may vary in size and shape. The cellular system of FIG. 1 may be an analog or digital communication system, and may employ one or more of several types of multiple access modulation schemes, such as Code Division Multiple Access (CDMA), Time Division Multiple Access (TDMA) or Frequency Division Multiple Access (FDMA).

For switching off a radiotelephone, it must be determined which radiotelephone 12 is powered on, and the cell base station 14 or 15 that the radiotelephone 12 is receiving from. To find the radiotelephone 12, the cellular system broadcasts a message, often called a page, in many cells 10, 11, 13. When the radiotelephone 12 responds, the cellular system continues handling the call with further communication being directed to one of the cells 10, 11, 13 containing the radiotelephone 12. If the system has no knowledge of the location of the radiotelephone 12, the system must broadcast pages in every sector of every cell 10, 11, 13. As the cellular communication system traffic increases, the communication resources to support system-wide paging in a large metropolitan area become huge, because each radiotelephone 12 has to register with at least one base station 14, 15 to inform the cellular system where it is located, and to become controlled and paged one or more base stations 14, 15.

When a radiotelephone 12 is turned on, it typically must search for and acquire a pilot signal, which is in a CDMA system continuously transmitted by the base stations 14. The pilot signal is used by the radiotelephone 12 to obtain initial system synchronization and to provide robust time, frequency, and phase tracking of the signals from the base stations 14. Pilot signal acquisition typically takes a few seconds. This is largely due to the proximity of the cell base stations 14 to the radiotelephone 12 and the fact that the cell 10 is stationary. When the strongest signal is found, the radiotelephone 12 registers with that cell's base station 14.

Figure 2:
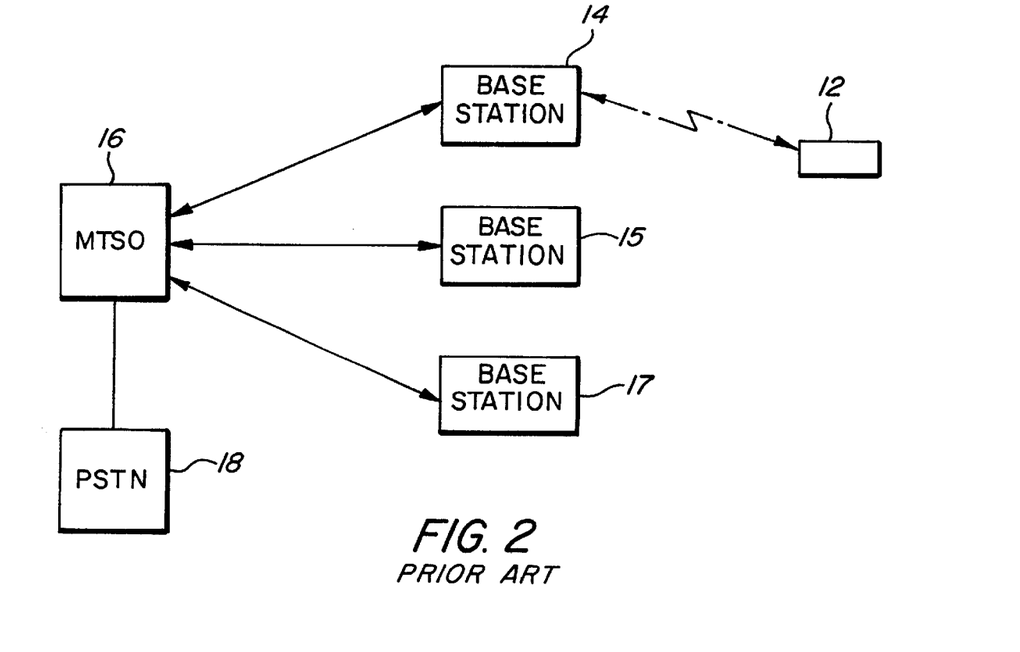
FIG. 2 is a diagramatic illustration showing an exemplary cellular communication system network.

Referring to FIG. 2, when the radiotelephone 12 registers, it typically transmits, via its transceiver, identification parameters. These parameters may include its serial number and associated telephone number or numbers. The registration information is received at a transceiver located at a base station 14 for the cell 10 in which the radiotelephone 12 is located. The registration information is relayed on to a mobile telephone switching office (MTSO) 16 by the receiving base station 14. One function of the MTSO 16 is to route calls between the Public Switched Telephone Network (PSTN) 18 and various cells 10. MTSO 16 typically also contains a database with information relative to the cell structure.

In CDMA cellular communication systems, radiotelephones are paged in the various cells in order to identify the cell in which a radiotelephone is located, for call routing purposes. For this type of communication system, the system needs to determine the set of cells that the radiotelephone may have entered. A process known as registration enables a group of cells within which the radiotelephone would most likely be located to be identified. In the zone registration technique the amount of paging in the cellular system is reduced by dividing the system into zones and the radiotelephone is paged at all cells within the zone. For that purpose, the radiotelephone typically maintains a list of zones that it has recently visited, and, if it enters a zone not on the list, it then registers in a new zone. Every cell base station 14, 15, 17 broadcasts in the zone to which it is assigned. Upon radiotelephone registration in a particular cell, the MTSO uses the cell structure database to determine a zone, according to the distance of the radiotelephone from the cells. When a call intended for transfer to the radiotelephone is received at the MTSO, MTSO instructs the cells corresponding to the zone in which the radiotelephone is registered to transmit a paging message to the radiotelephone.

When paging by the base stations in the cells within a determined paging zone is accomplished, the radiotelephone, if still within the zone and in condition to receive the page, responds to the received page by transmitting a response message that is received by the base stations for the cells in which the radiotelephone is located or was previously located. The response to the page is relayed by the receiving cell base station to the mobile telephone switching office. The mobile telephone switching office identifies, through relay of the response by the cell base stations, the cell in which the radiotelephone is currently located. The mobile telephone switching office routes a call intended for the radiotelephone to the base station corresponding to the cell in which the radiotelephone is located.

In accordance with the conventional "distance based registration method", each cell base station transmits its location information and a predetermined limit distance value. In this method, each radiotelephone calculates a distance between the cell base station for the cell in which it is located, based upon the transmitted current cell base station location information, and a previous cell base station location information in which the radiotelephone was previously registered. The radiotelephone then checks whether the distance of the radiotelephone is greater than some predefined limit distance value from the previous cell, by comparing the computed distance with the limit distance value from the previous cell base station, and registers with the current cell base station when the computed distance is greater than the previous cell base station limit distance value. The registration information is relayed on to the mobile telephone switching office, where a determination is made of a zone of cells for paging of the radiotelephone. The radiotelephone stores in its memory the zone information.

Several systems, such as Advanced Mobile Phone System (AMPS) and GSM, use a timer or a counter method to determine the location of a radiotelephone. In a cellular system implementing the timer method, each radiotelephone registers with the base station every several seconds. The velocity of the movement of the cellular radiotelephone is estimated, and the approximate distance that it could have traveled is calculated from the time when the radiotelephone last registered. However, AMPS handoffs frequently fail, causing dropped calls, which contributes to perceptions of poor service quality. Moreover, each handoff is preceded and followed by long intervals of poor link quality, resulting in annoying noise and distortion.

In an alternative conventional method, base stations determine boundaries of their coverage areas with scaled contour shapes. The contour shapes have minimum and maximum boundaries which are generated based upon RF measurements of each base station. The intersections of the scaled contour shapes define a bounding polygon area that describes the spatial position of a cellular radiotelephone in terms of error estimates. The center of the polygon is determined, whereupon the radiotelephone location address may be determined through reference to a database. Yet another distance control CDMA method is used in satellite communication systems to provide a handoff by mobile radiotelephone's receiver, which drops one satellite and synchronizes to another, by employing the receiver's and transmitter's known positions to make a switch.

Presently, when a mobile radiotelephone is working in a digital CDMA mode and moving towards an AMPS-only area, which means that the base station only handles analog signals, a handoff has to be performed by switching the mobile radiotelephone from digital into analog mode, if the mobile radiotelephone has the capability, and the radiotelephone has to stay in analog mode which is not always preferable. Moreover, the IS-95A standard prescribes that all CDMA base stations and radiotelephones in the future will have to be equipped with both analog and digital mode. In such a system, when the mobile radiotelephone is in a disadvantaged reception area, where the digital transmission is weak and may drag down the other mobiles of the power-controlled CDMA system, a soft handoff will have to be performed by switching into an analog mode. However, the IS-95A standard does not provide the option of switching back into digital mode.

OBJECTS AND SUMMARY OF THE INVENTION

It is a primary object of the present invention to overcome the aforementioned shortcomings associated with the prior art and to perform a smooth handoff by obtaining accurate information of the spatial position of the cellular radiotelephone.

Another object of the present invention is to obtain the spatial position information quickly, in order to perform rapid dropoff or handoff operation.

These as well as additional objects and advantages of the present invention are achieved by providing a unique method using a cellular radiotelephone which has its own positioning system for acquiring satellite signals to establish an exact spatial position of the cellular radiotelephone. This information may be transferred to a cell base station, in order to perform the dropoff or a handoff of the cellular radiotelephone to another base station or frequency, based on the quality level of the communication signal. The system preferably uses a code division multiple access technique, and the positioning system is preferably a global positioning system (GPS) which may receive signals from at least one communications satellite.

The method of the present invention may be used to determine the base station closest to the cellular radiotelephone. In the alternative, it may be used to compute a distance between the cellular radiotelephone and a location where the quality level of the cellular radiotelephone communication signal is predicted to be less than the predetermined value, and to determine from the computed distance whether the cellular radiotelephone should be handed off. Determination of the spatial position of the cellular radiotelephone is preferably obtained by a triangulation method based on the timing of satellite signals. In one embodiment of the present invention each radiotelephone in a cell has to register with the base station of that cell, and the base station pages all radiotelephones in the cell to request their spatial position. The computation of the distance and determination whether the cellular radiotelephone should be handed off or dropped off may be performed in the base station or in the cellular radiotelephone, based on location information of the cell base station and a predetermined distance value transmitted to the cellular radiotelephone by the base station.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

The following description is provided to enable any person skilled in the art to make and use the invention and sets forth the best mode contemplated by the inventor of carrying out the invention. Various modifications, however, will remain readily apparent to those skilled in the art, since the general principles of the present invention have been defined herein specifically to provide a cellular communication device which is capable of acquiring satellite signals to establish its spatial position, on order to accomplish smooth handoff or dropoff.

Cellular radiotelephones of the present invention preferably use one of the spread spectrum communication systems, such as CDMA, because these systems provide precision needed for navigational ranging, direction finding, collision avoidance, homing and surveying. Additionally, conventional CDMA cellular communication systems have all their base stations hooked up to satellites for clock synchronization. The base stations use positioning system terminals, such as Global Positioning System (GPS) terminals, to find the location of the satellites. Some automobiles, such as Mitsubishi Montero, use a GPS chip mounted in the car to determine the spatial position of the car for navigational purposes. In communication systems which already have GPS terminals, base station messages, sent to each radiotelephone, may include satellites locations. In addition, as is conventionally known in the art and discussed above, each base station may send its own location information, which typically includes latitude and longitude, and a predetermined distance limit.

Figure 3:
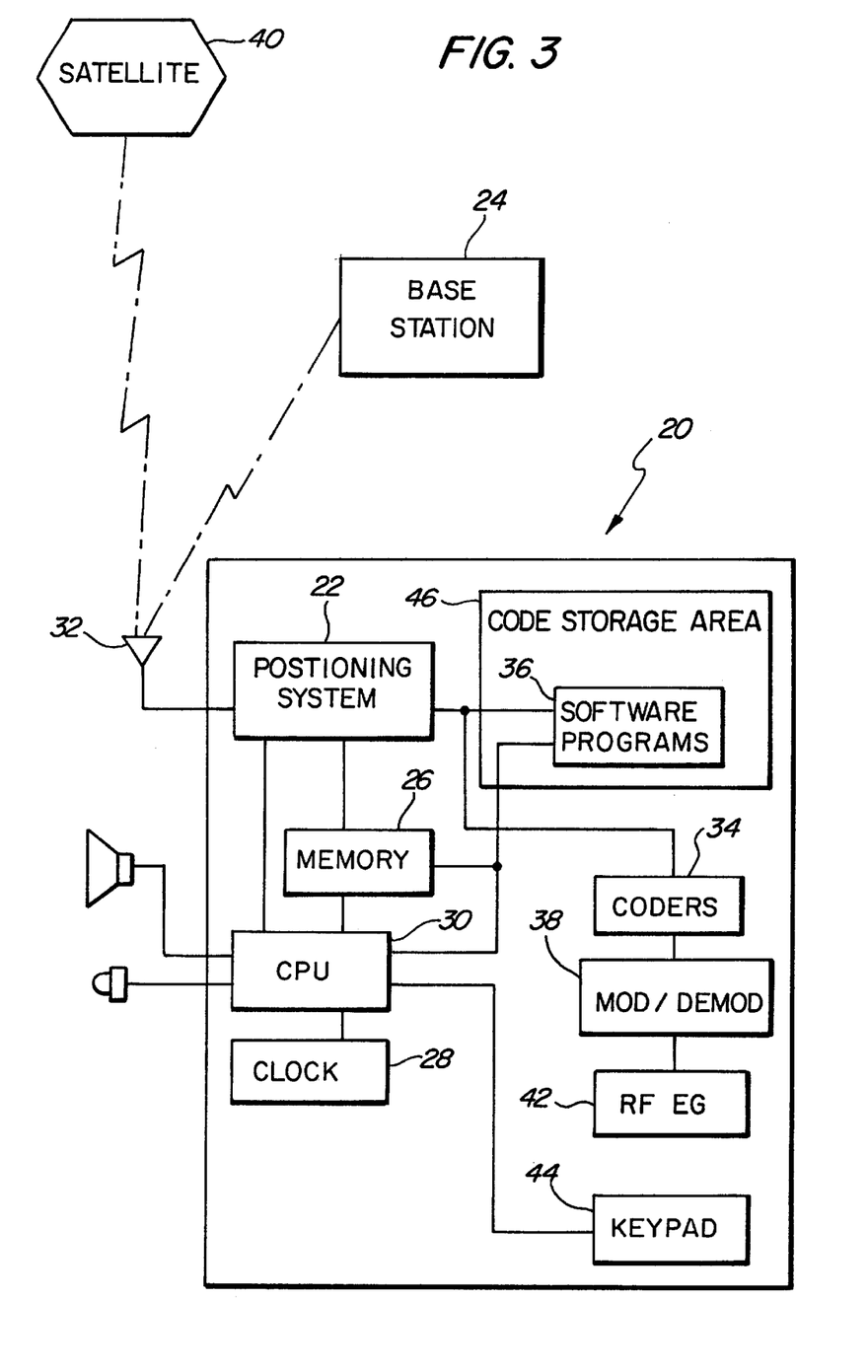
FIG. 3 is a diagramatic illustration of the components of a radiotelephone, according to a preferred embodiment of the present invention.

Referring to FIG. 3, a typical radiotelephone 20 of the present invention is illustrated. It is equipped with a positioning system 22, preferably the Global Positioning System (GPS), in order to determine its spatial position on Earth. This information may be transferred to a base station 24 and it may be used in handoff or dropoff operation. The radiotelephone 20 includes a positioning system memory 26 that may store a database with the ephemeris of each satellite. This memory 26 is preferably a nonvolatile random access memory (RAM) which allows the radiotelephone 20 to update its ephemeris data when a satellite is out of service or changes orbits. Alternate embodiments may use a programmable read only memory in which each satellite's ephemeris is permanently stored. Still another alternate embodiment uses a battery backed-up RAM. The radiotelephone 20 also has conventional elements such as a real-time clock 28, a microprocessor 30 to control the operations of the radiotelephone 20 and perform calculations, an antenna 32, coders 34 to encode and decode the user's voice, a modulation/demodulation circuit 38, a code storage area like EPROM 46 with application software programs 36, a keypad 44, and radio frequency electronics 42 that converts modulated signals to higher frequencies for transmission and received signals to lower frequencies.

The positioning system 22 preferably transmits spread spectrum signals usable for a range measurement of the radiotelephone 20 from a known satellite 40 location. The process of finding a satellite 40 signal begins with the radiotelephone 20 synchronizing its internal real-time clock 28 to the satellite 40 system time, kept by the satellites 40 and base stations' 24 internal clocks. When the radiotelephone 20 knows the time and the ephemeris of each satellite 40, it knows the location of the satellites 40 in relation to Earth. The radiotelephone's 20 knowledge of the times and locations of the satellites 40 relative to Earth enables it to determine which frequencies and PN codes are available and should be searched to acquire the satellite 40 signal. For this reason, the GPS receiver memory 26 database stores a signal carrier frequency for each satellite 40, to be able to acquire a pilot satellite communication signal and determine satellite 40 position relative to Earth. The positioning system 22 terminal in the radiotelephone 20 locates pilot carrier signals transmitted by the satellites 40, using known frequencies and pseudo noise (PN) codes, thus allowing the radiotelephone 20 to distinguish the different satellites 40. When the connection is made, the satellite 40 transmitter provides the positioning system receiver 22 in the radiotelephone 20 with the satellite 40 location.

The radiotelephone 20 has to determine its own spatial position in relation to Earth. This position may be determined by triangulation with different satellites 40, with a single satellite 40 at different spatial positions over time, or in some other conventional way. Since the radiotelephone 20 knows the satellites 40 positions, it may measure the time required for signals to reach and return from each satellite 40, in order to determine the satellite's position in relation to the receiver on Earth. Preferably, a triangulation method is used to calculate this location using receivers at three different locations at the same time, because the difference in signaling waveform between each receiver and the transmitter is a function of time, and thus distance. Sophisticated GPS receivers have several receivers and can work with several satellite 40 signals at the same time. The low cost receivers use only one receiver, which must sequentially acquire and make range measurements on at least three satellite signals.

The software programs 36 are capable of supporting a predetermined communication protocol between the radiotelephone 20 and the base station 24, and they assist in connecting the positioning system 22 with the existing radiotelephone components, such as microprocessor 30, memory 26 and keypad 44. The software programs 36 may also include programs to control the microprocessor 30, such as when calculating a distance to the base station 24 or another location.

In one aspect of the present invention, when a base station 24 pages the radiotelephone 20, the base station 24 message is sent to each radiotelephone 20. The message may include satellites' locations, the base station 24 location information, which typically includes its latitude and longitude, a predetermined distance limit, and any other parameter which may be used by the microprocessor 30 in the radiotelephone 20 to detect whether it is a candidate for a handoff or dropoff. The radiotelephone 20 may determine on its own that it is a candidate for a handoff or dropoff and this information may be transferred in a message to the base station 24.

In an alternative embodiment, the base station 24 may periodically request broadcast of latitude and longitude parameters from each radiotelephone 20 in the cell, and store this information for future use, when determining whether a handoff or dropoff should be performed. Since the base station 24 has information about its own latitude and longitude, it may calculate the distance of each radiotelephone 20 from the base station 24 or a low-signal area and, in the periodic or urgent broadcast, suggest handoff to another base station with the same or different frequency, handoff to a different frequency within the same base station, or a dropoff.

In yet another alternative embodiment, the base station 24 may request radiotelephone 20 location data only when it suspects that one of the radiotelephones in the cell should be handed off or disconnected. When requested, the radiotelephone 20 may obtain its location from the satellite 40 location and send this information to the base station 24.

In any case, when it is predicted that an active radiotelephone 20 will be in an area which causes bad reception, the base station 24 may send to the radiotelephone 20 a special alarm signal, so that the radiotelephone 20 may be dropped off or handed off before it degrades the performance of other radiotelephones.

It should be further understood that, although described in relation to the radiotelephone 20 traveling through the cells, the same method of using the GPS to acquire information on the radiotelephone 20 exact location and sending it to a base station may be very beneficial upon an initial power-up of the radiotelephone 20, to determine whether it can safely operate. Moreover, the same method and equipment may be used to quickly determine the base station closest to that radiotelephone 20, which should have control over the radiotelephone 20.

Furthermore, some communication techniques need to know the location of the radiotelephone. For example, in power control CDMA systems, each radiotelephone decreases and increases its transmission power based on its distance from the base station, so that the base station may receive input signals which all have the same power. A more accurate determination of the transmission signal power level may be obtained with the preferred embodiment of the present invention in which the radiotelephone may obtain the distance from the base station 24 with high accuracy because its calculation is based on the exact location of the radiotelephone 20 determined with the GPS.

The radiotelephones 20 of the present invention preferably utilize the positioning system 22 in the form of a GPS chip, which may be integrated into the radiotelephone 20. The chip may preferably be turned on and off at will, to save power when GPS-assisted handoff is not desired. In the alternative, a GPS terminal may be an accessory placed outside the radiotelephone 20 and attachable to the internal components of the radiotelephone 20 with connectors, not shown. The accessory may use the radiotelephone keypad 44 for the user's commands. In both cases, communication with the base station 24 is accomplished with the application software 36 stored in the radiotelephone's code storage area 46.

The radiotelephone system in the preferred embodiment of the present invention, although applicable to any cellular communication system, is believed to be especially applicable to the GSM cellular radiotelephones which use the Code Division Multiple Access (CDMA) technique, to prevent excessive handoffs when choosing the best base station. Alternate embodiments may use other cellular communication systems, like Time Division Multiple Access (TDMA) or Frequency Division Multiple Access (FDMA) systems.

The method of the present invention may also be used in Advanced Mobile Phone System (AMPS), to prevent excessive frequency hopping. Presently, inexpensive cellular radiotelephones use analog radiotelephones which can only tune to one frequency at the time. When the signal becomes weak, the audio signal is discontinued by the base station because it would be very disruptive to wait for many milliseconds while the radiotelephone is trying to tune itself to a different frequency. In the cellular radiotelephone the present invention, the base station is able to determine which base station has the best signal for the handoff, and the radiotelephone would have a smooth handoff and stay on longer with the present base station, thus reducing the number of dropped calls.

The present invention also overcomes the shortcoming dictated by the IS-95A standard because the cellular radiotelephone does not have to stay in analog mode, after switching to it in an disadvantaged reception area with a weak digital transmission. The radiotelephones with the GPS system, before entering an area with a weak signal, such as a tunnel, may receive a warning signal from the base station to switch itself to another frequency or to the AMPS system, if it has analog capabilities, which prevents degradation of the whole system. The radiotelephone may switch back when the signal becomes strong again. The base station would have the warning information due to the fact that it would periodically receive exact location information from each cellular radiotelephone, and could predict the future location of the radiotelephone by calculating its velocity and direction of movement. Since the base station can store maps of the cell in its computer, it would know the areas causing weak signals and be able to detect the radiotelephone approaching such an area.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein, and be implemented in any similar device which transmits information from a cellular device to a base station, such as cellular modems or fax machines.

What is claimed is:

1. A communication system, comprising:
    one or more radiotelephones;
    a plurality of base stations for transmitting communication signals to and receiving communication signals from the radiotelephones;
    a positioning system in at least one of the radiotelephones for determining the spatial position of the radiotelephone;
    wherein one of the base stations performs a dropoff of the radiotelephone containing the positioning system when the quality of the radiotelephone communication signal is predicted to be less than a predetermined value based on the spatial position of the radiotelephone, the radiotelephone being dropped from the communication system when the base station performs the dropoff;
    the positioning system uses GPS satellite signals to determine spatial position;
    the radiotelephone further comprises:
        a data storage area for storing ephemeris data of the GPS satellites;

a clock synchronized with one of the GPS satellites;

a code storage area including software programs; and a microprocessor for executing the software programs.

2. The communication system of claim 1 wherein the software programs are adapted to determine the base station closest to the radiotelephone.

3. The communication system of claim 1 wherein the software programs are adapted to register the radiotelephone with one of the base stations, to answer pages from the base station, and to send the spatial position of the radiotelephone to the base station.

4. The communication system of claim 3 wherein the software programs are adapted to compute a distance between the radiotelephone and a location where the quality level of the radiotelephone communication signal is predicted to be less than the predetermined value, and to determine whether to handoff the cellular radiotelephone based on the computed distance.

5. The communication system of claim 3 wherein the software programs are adapted to compute a distance between the radiophone and the base station, and to determine whether to handoff the radiotelephone based on the computed distance.

6. The communication system of claim 3 wherein the software programs are adapted to compute a distance between the radiophone and the base station, and to determine whether to dropoff the radio telephone based on the location of the base station and a predetermined distance value transmitted to the radiotelephone by the base station.

7. A communication system, comprising:

one or more radiotelephones;

a plurality of base stations for transmitting communication signals to and receiving communication signals from the radiotelephones;

a positioning system in at least one of the radiotelephones for determining the spatial position of the radiotelephone;

wherein one of the base stations performs a dropoff of the radiotelephone containing the positioning system when the quality of the radiotelephone communication signal is predicted to be less than a predetermined value based on the spatial position of the radiotelephone, the radiotelephone being dropped from the communication system when the base station performs the dropoff;

the positioning system uses GPS satellite signals to determine spatial position of the radiotelephone further comprises:

a data storage area for storing ephemeris data of the GPS satellites;

a clock synchronized with one of the GPS satellites;

a code storage area including software programs;

a microprocessor for executing the software programs; and a detachable GPS receiver connected to the radiotelephone.

8. In a communication network including a radiotelephone and a plurality of base stations, a method for performing radiotelephone handoff and dropoff comprising the steps of:

determining the spatial position of the radiotelephone using a positioning system;

determining a distance between the radiotelephone and a location where the quality level of a radiotelephone communications signal is predicted to be less than a predetermined value, based upon the spatial position of the radiotelephone;

comparing the determined distance with a distance limit to predict a quality level of a radiotelephone communication signal based on the spatial position of the radiotelephone;

performing a dropoff of the radiotelephone from the communication network when the quality level of the radiotelephone communication signal is predicted to be less than a first predetermined value; and performing a handoff of the radiotelephone when the quality of the radiotelephone communication signal is predicted to be less than a second predetermined value.

9. The method of claim 8 wherein handoff of the radiotelephone is to another base station.

10. The method of claim 8 wherein handoff of the radiotelephone is to another frequency.

11. The method of claim 8 wherein the communication signal is a Code Division Multiple Access (CDMA) signal, and the radiotelephone includes a GPS receiver.

12. The method of claim 8 further comprising the steps of:

registering the radiotelephone with at least one of the base stations;

answering pages from the base stations; and sending the spatial position of the radiotelephone to at least one of the base stations.

13. The method of claim 12 further comprising the steps of:

computing a distance between the radiotelephone and a location where the quality of the radiotelephone communication signal is predicted to be less than a second predetermined value; and determining whether to handoff the radiotelephone based on the computed distance.

14. The method of claim 13 wherein the steps of computing the distance and determining whether to handoff the radiotelephone are performed in one of the base stations.

15. The method of claim 13 wherein the steps of computing the distance and determining whether to handoff the radiotelephone are performed in the radiotelephone.

16. The method of claim 12 wherein the paging step is performed only when the radiotelephone is to be handed off.

17. The method of claim 8 wherein the base station performs a dropoff of said cellular radiotelephone based on the cellular radiotelephone spatial position.

18. The method of claim 8 further comprising the steps of:

computing a distance between the radiotelephone and a location where the quality of the radiotelephone communication signal is predicted to be less than the first predetermined value; and determining whether to dropoff the radiotelephone based on the computed distance.

19. The method of claim 18 wherein the steps of computing the distance and determining whether to dropoff the radiophone are performed in the radiotelephone.

20. The method of claim 8 further comprising the step of computing the distance between the radiotelephone and one of the base stations.

21. A radiotelephone for use in a communications system, comprising:

a cellular communications unit for transmitting a cellular communication signal with at least one base station;

a global positioning system electrically coupled to the cellular communications unit, for determining the spatial position of the radiotelephone;

positioning system memory for storing data indicating an ephemeris of a plurality of satellites;

the cellular communications unit further comprises a central processing unit (CPU), a memory electrically coupled to the CPU, and software programs stored on the memory and executable by the CPU to support a communication protocol between the radiotelephone and the at least one base station; and the at least one base station is capable of performing a drop-off of the radiotelephone when the quality of the radiotelephone communication signal is predicted to be less than a predetermined value based upon the spatial position of the radiotelephone.

22. The radiotelephone of claim 21, wherein the software programs further comprise a second software program to determine whether the radiotelephone is a candidate for a handoff based upon the spatial position of the radiotelephone, a base station position, and a distance limit, the base station position and the distance limit being received from the at least one base station.

23. The radiotelephone of claim 21, wherein the software programs further comprise a second software program to transmit the spatial position to the at least one base station upon receipt of a position request from the at least one base station.

24. The radiotelephone of claim 21, wherein the software programs further comprise a second software program to perform a handoff upon receipt of an alarm signal from the at least one base station.

25. A radiotelephone for use in a communications system, comprising:

first means for transmitting a cellular communication signal to at least one base station;

second means for determining a spatial position of the radiotelephone;

third means for storing data indicating an ephemeris of a plurality of satellites;

the first means further comprises a support means to support a communication protocol between the radiotelephone and the at least one base station; and the at least one base station is capable of performing a drop-off of the radiotelephone when the quality of the radiotelephone communication signal is predicted to be less than a predetermined value based upon the spatial position of the radiotelephone.

26. The radiotelephone of claim 25, wherein the second means further comprises storage means for storing a database that includes data indicating an ephemeris of a plurality of satellites.

27. The radiotelephone of claim 25, wherein the first means further comprises means for supporting a communication protocol between the radiotelephone and the at least one base station.

28. The radiotelephone of claim 27, wherein the first means further comprises means for determining whether the radiotelephone is a candidate for a handoff based upon the spatial position of the radiotelephone, a base station position, and a distance limit, the base station position and the distance limit being received from the at least one base station.

29. The radiotelephone of claim 27, wherein the first means further comprises means for transmitting the spatial position to the at least one base station upon receipt of a position request from the at least one base station.

30. The radiotelephone of claim 27, wherein the first means further comprises means for performing a handoff upon receipt of an alarm signal from the at least one base station.

31. A method for controlling communications of a radiotelephone with at least one base station, comprising the steps of:

establishing a cellular communications link with at least one base station;

determining a spatial position of the radiotelephone, wherein the spatial position is employed to control a state of the cellular communications link with the at least one base station;

storing data indicating an ephemeris of a plurality of satellites into a storage area within the radiotelephone;

receiving a base station position and a distance limit from the at least one base station;

determining a distance between the radiotelephone and a location where the quality level of the cellular communications link is predicted to be less than a predetermined value, based upon the spatial position of the radiotelephone;

comparing the determined distance with the distance limit to determine whether the radiotelephone is a candidate for a handoff; and notifying the at least one base station that the radiotelephone is a candidate for handoff.

32. The method of claim 31, further comprising the step of transmitting the spatial position to the at least one base station upon receipt of a position request from the at least one base station.

33. The method of claim 31, further comprising the step of performing a handoff upon notifying the at least one base that the radiotelephone is a candidate for handoff.

* * * * *